US012625340B2

(12) United States Patent
Krzanowski et al.

(10) Patent No.: US 12,625,340 B2
(45) Date of Patent: May 12, 2026

(54) LENS ALIGNMENT

(71) Applicant: Aptiv Technologies AG, Schaffhausen (CH)

(72) Inventors: Maciej Krzanowski, Dublin (IE); Jakub Szela, Dublin (IE)

(73) Assignee: Aptiv Technologies AG, Schaffhausen (CH)

( * ) Notice: Subject to any disclaimer, the term of this patent is extended or adjusted under 35 U.S.C. 154(b) by 414 days.

(21) Appl. No.: 18/353,724

(22) Filed: Jul. 17, 2023

(65) Prior Publication Data

US 2024/0019656 A1     Jan. 18, 2024

(30) Foreign Application Priority Data

Jul. 18, 2022    (EP) ..................................... 22185519

(51) Int. Cl.
*G02B 7/00* (2021.01)
*G02B 7/02* (2021.01)

(52) U.S. Cl.
CPC ............. *G02B 7/003* (2013.01); *G02B 7/023* (2013.01); *G02B 7/025* (2013.01)

(58) Field of Classification Search
CPC ........ G02B 7/003; G02B 7/023; G02B 7/025; G02B 27/0075; G02B 7/36; H04N 23/58; H04N 23/67
See application file for complete search history.

(56) References Cited

U.S. PATENT DOCUMENTS

2018/0004004 A1 * 1/2018 Tamasanis ............. G02B 27/62

FOREIGN PATENT DOCUMENTS

| CN | 114598859 | 6/2022 |
| JP | 2005055618 | 3/2005 |
| JP | 2011205263 | 10/2011 |

OTHER PUBLICATIONS

"Extended European Search Report", EP Application No. 22185519. 0, Jan. 18, 2023, 12 pages.
Kwon, et al., "Performance Evaluation of MTF Peak Detection by a Statistical Analysis for Phone Camera Modules", Feb. 2016, 6 pages.

* cited by examiner

*Primary Examiner* — James C. Jones
(74) *Attorney, Agent, or Firm* — Harness, Dickey & Pierce, P.L.C.

(57) ABSTRACT

The present disclosure relates to lens alignment methods, lens alignment software, lens alignment apparatuses, and vehicle cameras. In an aspect, a lens alignment method includes performing a scan at a plurality of regions of interest of the lens to determine optical characteristics for each region of interest as the position of the lens relative to the imager is adjusted. Focus windows for each region of interest are determined based on the optical characteristics and the position of the lens relative to the imager is adjusted based on predetermined positions of the focus windows relative to one another.

14 Claims, 3 Drawing Sheets

LENS ALIGNMENT

INCORPORATION BY REFERENCE

This application claims priority to European Patent Application No. EP22185519.0, filed Jul. 18, 2022, the disclosure of which is incorporated by reference in its entirety.

BACKGROUND

Automotive cameras are required to provide a high optical performance over a long operating life. In order to maximise optical performance, the manufacturing process includes a multi-axis lens alignment step to achieve optimized alignment between the lens and the imager. During this step, in order to optimise the depth of focus, the position of the lens is adjusted relative to the imager so that one or more regions of interest (ROI) are in focus. In this respect, FIG. 1 shows a typical Modulation Transfer Function (MTF) response chart used for this alignment step when assembling an automotive camera. Each region of interest has an associated MTF curve 2 characteristic of the optical performance for that region, and the position of the lens is adjusted so that the measured MTF peaks 1 are as close together as possible. Consequently, the MTF peak 1 for each respective MTF curve 2 indicates the maximum focus for the associated tested region of interest. Accordingly, by adjusting the position of the lens, the MTF peaks 1 may be aligned so that the optical performance is optimised for the particular regions of interest. This alignment process may also include compensation for adhesive shrinkage and desired focussing distance. Once aligned, the lens is then initially fixed in that position using a UV curable adhesive, and later thermally cured to secure the fixing. The adhesive shrinkage compensation may compensate for both the UV and thermal curing stages.

In use, however, the optical performance of a camera will typically degrade over time, as the lens shifts out of alignment relative to the imager. For example, built-in stresses within components in the assembly will relax over time, particularly as automotive cameras are subjected to mechanical and thermal stress cycles. This leads to the shifting of the position of the lens through the operating lifespan of the camera.

A consequence of the above shifting is that the MTF curves 2 associated with some regions of interest will move over time, with some regions being affected more than others. For instance, a camera may have a minimum MTF performance threshold, such as MTF 0.4, and the camera's depth of focus 3 is therefore defined by the positions where all the MTF curves 2 are above that threshold. At the same time, lenses typically exhibit corner defocus where a narrower depth of focus is achieved at peripheral regions of interest. Consequently, where the MTF curves associated with these ROIs shift, the camera's depth of focus 3 may be reduced, because these ROIs may no longer be adequately resolved. For example, in FIG. 1, the depth of focus 3 is defined by MTF4 curve at the near Z position and MTF3 curve at the far Z position. Therefore, if the MTF4 curve shifts to a higher Z position or the MTF3 curve shifts to a lower Z position, the depth of focus 3 is reduced. As a consequence, the camera may begin to drop below its required specifications.

Accordingly, there remains a need for an automotive camera with a longer operating lifespan.

SUMMARY

According to a first aspect, there is provided a lens alignment method including: scanning a plurality of regions of interest of the lens to determine optical characteristics for each region of interest as the position of the lens relative to the imager is adjusted; determining a focus window for each region of interest based on the optical characteristics; and adjusting the relative position of the lens to the imager based on predetermined positions of the focus windows relative to one another.

In this way, the alignment process may maximise the depth of focus across all the applicable regions of interest. Consequently, a camera with a high long-life performance may be achieved because, even as the lens shifts position over time, the regions of interest will be above the minimum optical performance requirements for longer. Therefore, better compensation of defocus related to ageing may be achieved.

In embodiments, the step of determining the focus windows comprises determining positions where the optical characteristics are above a predetermined threshold. In this way, the threshold may be used as a minimum optical performance requirement, and the position where those optical performance requirements are met for each region of interest can be determined based on the optical characteristics, such as MTF characteristics.

In embodiments, the scan includes determining MTF characteristics as the distance between the lens and the imager is varied.

In embodiments, the step of adjusting the position of the lens includes determining a centre depth of focus for each focus window and adjusting the position of the lens in relation to the determined centre depth of focuses. In this way, the focus provided by each region of interest is set as a mid-point between the edges of its focus window. Consequently, accurate focussing may be achieved, even if the MTF characteristics are non-gaussian.

In embodiments, the step of adjusting the position of the lens includes adjusting the position for aligning the focus windows to within a predetermined range. In this way, the combined focus window, where the camera meets all optical performance requirements, may be maximised.

In embodiments, the step of adjusting the position of the lens includes adjusting one or more of the pitch, yaw, roll, position in the transverse plane, and position in the camera axis. It will be understood that the relative positions between the lens and imager may be adjusted by moving either the lens or the imager sensor or both. As such, up to 12 degrees of freedom control may be provided.

In embodiments, the step of adjusting the position of the lens includes applying a material compensation factor for compensating for material tolerances. In this way, known material properties, such as shrinkage properties of the adhesive used to fix the lens, may be accounted for.

In embodiments, the step of adjusting the material tolerances comprise material shrinkage and/or predicted aging movement characteristics. In this way, known adhesive shrinkage properties and/or ageing effects may be pre-emptively accounted for.

In embodiments, the step of adjusting the position of the lens includes applying a corner weighting factor for compensating for corner defocus. In this way, focus at the corners may be prioritised.

In embodiments, the lens alignment method further includes the step of providing the lens on a mount relative to the imager, wherein a curable adhesive is provided between the mount and the lens for fixing the lens in position when cured.

In embodiments, the method further comprises the step of fixing the position of the lens once its position is adjusted.

According to a second aspect, there is provided a non-transient computer readable medium including instructions, which when executed by one or more processors controlling a lens alignment apparatus performs the above method.

According to a third aspect, there is provided a computer software product including instructions, which when executed by one or more processors controlling a lens alignment apparatus performs the above method.

According to a fourth aspect, there is provided a lens alignment apparatus including: a jig for holding a lens and an imager and adjusting their positions relative to one another; an optical scanner for scanning a plurality of regions of interest of the lens to determine optical characteristics of the lens at each region of interest as the position of the lens relative to the imager is adjusted; and a controller configured to determine a focus window for each region of interest based on the optical characteristics and adjust the relative positions of the lens to the imager based on predetermined positions of the focus windows relative to one another.

According to a fifth aspect, there is provided a camera comprising: an imager; and a lens fixed relative to the imager for focussing an image thereon, wherein the fixed position of the lens relative to the imager is based on the above alignment method.

In embodiments, the alignment between focus windows comprises the optical characteristics being above a predetermined threshold.

In embodiments, the alignment between focus windows comprises each focus window having a centre depth of focus and the fixed position of the lens corresponding to a position of maximum alignment between the centre depth of focuses.

BRIEF DESCRIPTION OF THE DRAWINGS

Illustrative embodiments will now be described with reference to the accompanying drawings in which.

DETAILED DESCRIPTION

The present disclosure relates to lens alignment methods, lens alignment software, lens alignment apparatuses, and vehicle cameras manufactured using the methods. The disclosure is particularly relevant to automotive cameras having a long operating life, as well as manufacturing methods for providing the same.

Figure 1:
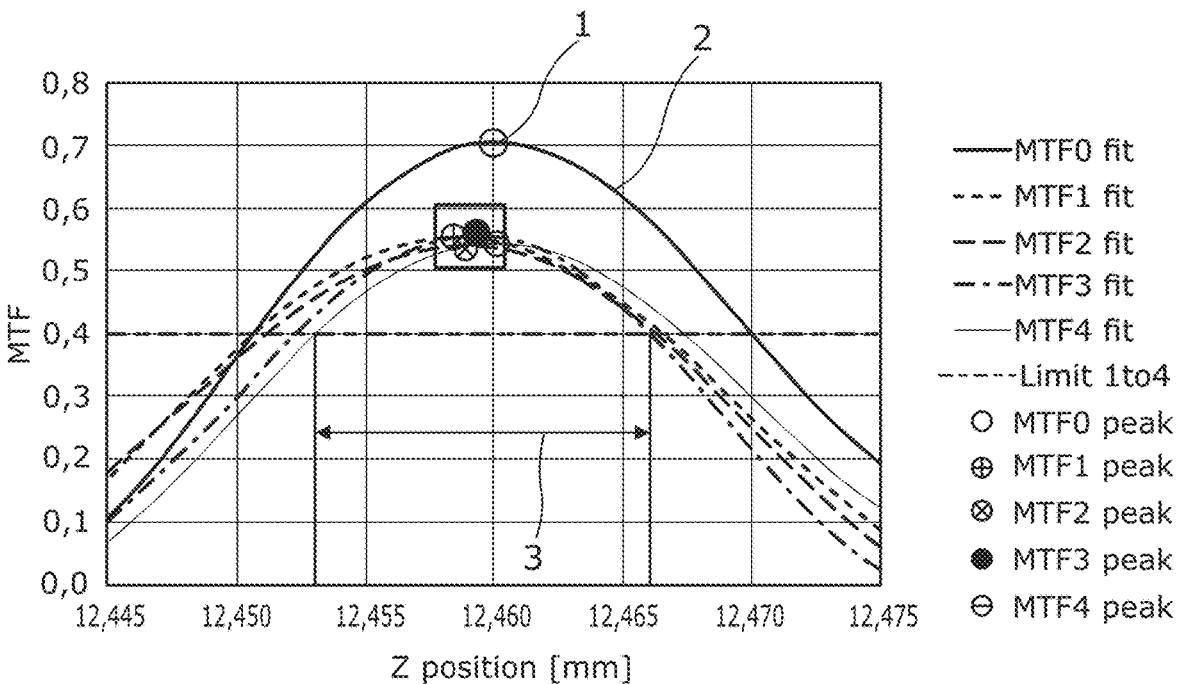
FIG. 1 shows a typical MTF response chart for an automotive camera during a conventional lens alignment process.
Figure 2:
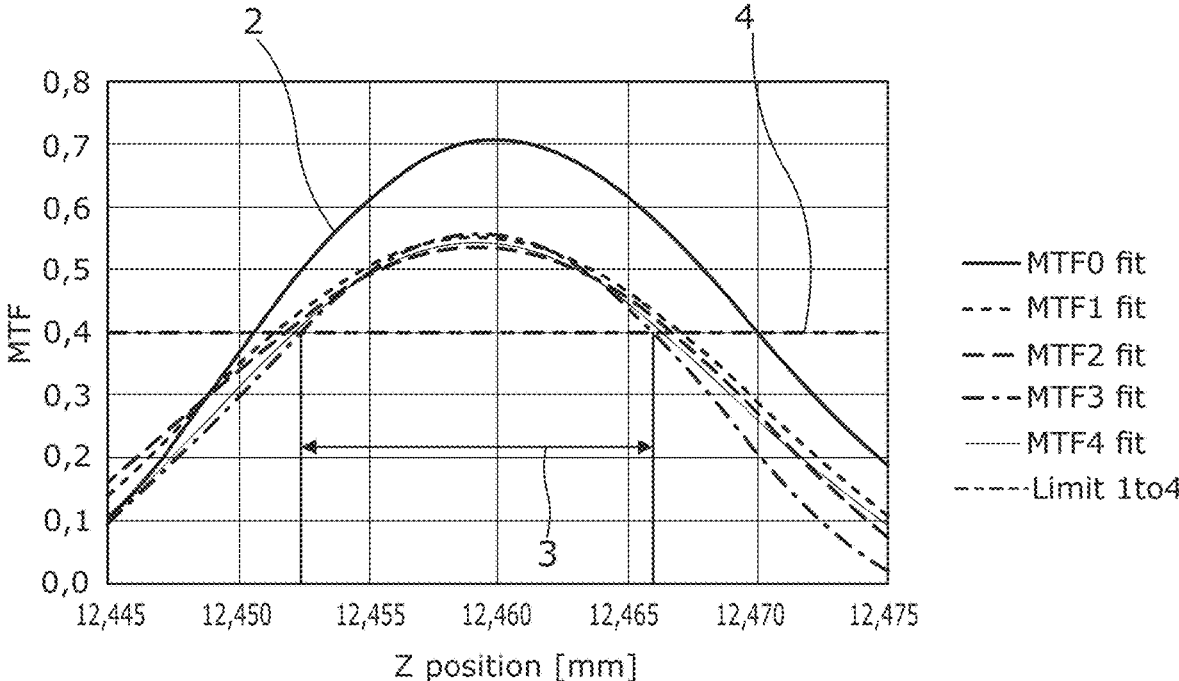
FIG. 2 shows a MTF response chart for an automotive camera during a lens alignment process according to an embodiment.

In contrast to conventional lens alignment methodologies, embodiments described herein are based on observing overall MTF performance, rather than alignment of the MTF peaks 1. In this connection, FIG. 2 shows a MTF response chart for an automotive camera during a lens alignment process according to an illustrative embodiment. As shown, each MTF region of interest (ROI) has an associated MTF response curve 2 based on the optical performance characteristics for that region of interest of the image. At the same time, a camera will be required to meet certain optical performance requirements designated by an MTF threshold 4. In this example, the MTF threshold is 0.4. Accordingly, for each MTF region of interest, there is a specific depth of focus for that ROI where its MTF response is above the particular threshold. In the lens alignment method of the present embodiment, the lens position is adjusted so that these focus windows are as aligned as possible for maximising the camera's combined focus window 3. As such, across this combined focus window 3 all the MTF curves 2 meet the minimum optical performance requirements set by the threshold 4. It will be understood that the number of regions of interest will be dependent on the particular camera requirements.

With the above method, by maximising the depth of focus 3 by adjusting the ROI focus windows, a longer camera operational life may be achieved. This is because, although defocussing related to ageing causes shifting of the MTF curves, the starting point is a larger window where sufficient optical performance is achieved. Consequently, the camera can maintain focus for longer.

Figure 3:
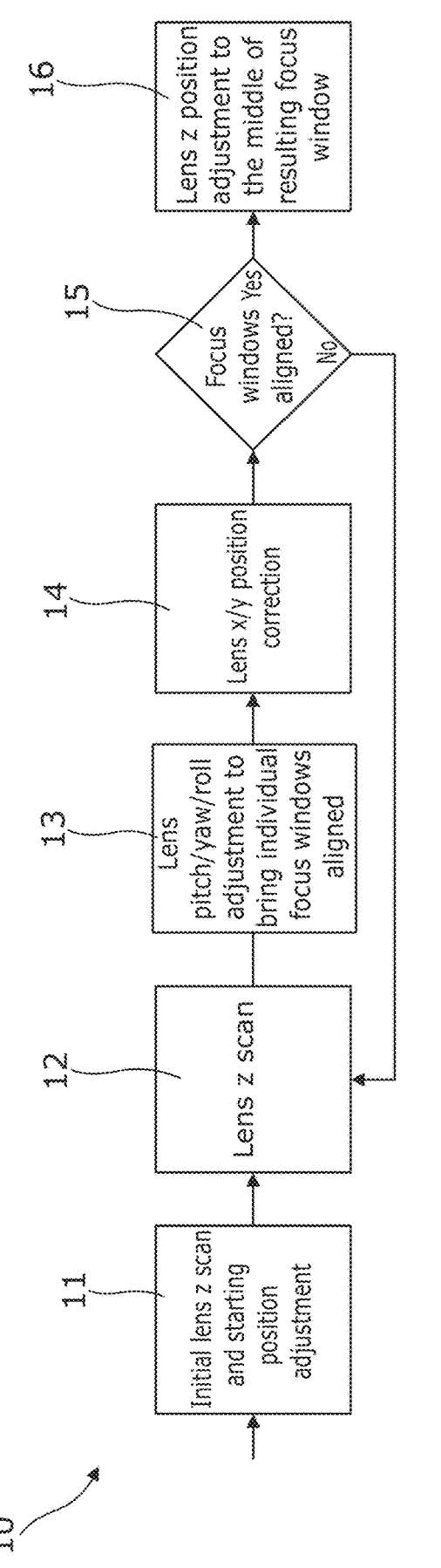
FIG. 3 shows a flow diagram of a lens alignment process according to an illustrative embodiment.

In this connection, to explain this further, FIG. 3 shows a flow diagram of a lens alignment process 10 according to the illustrative embodiment. This lens alignment process 10 will typically form part of a camera assembly process in which an image sensor subassembly is first produced, and then a lens assembly is fitted to it using a lens alignment apparatus. A layer of UV curable adhesive is sandwiched between the lens assembly and a mount for connecting the lens to the imager. The lens is then aligned to the imager using a jig part of the lens alignment apparatus in a multi-axis alignment process, as described below. The relative positions between the lens and imager may be adjusted by moving either the lens or the imager sensor or both. As such, up to 12 degrees of freedom control may be provided. Once aligned, the lens is fixed in place by snap curing the UV curable adhesive, followed by a thermal cure to finalise the fixture.

Figures 4, 5:
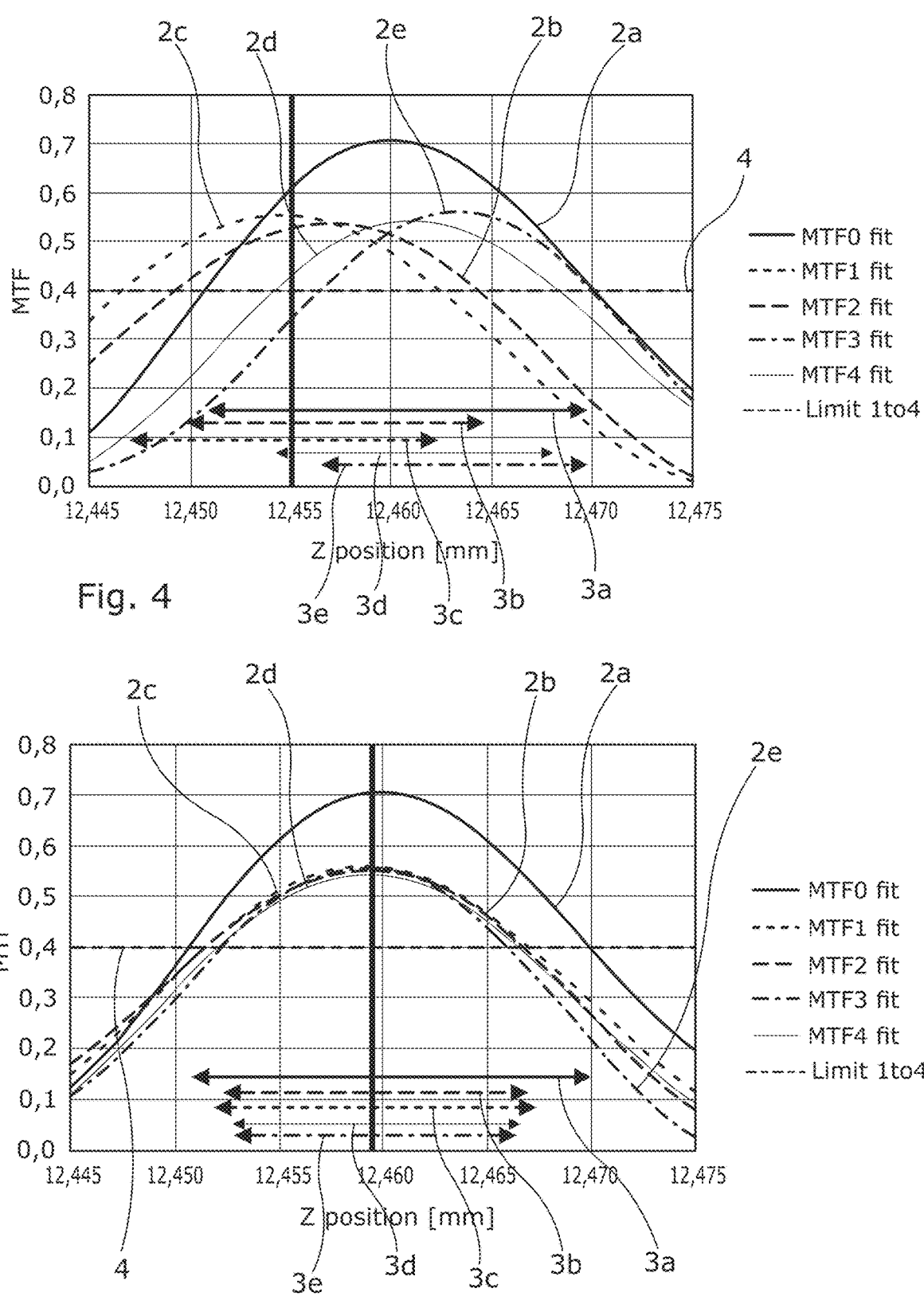
FIG. 4 shows a MTF response chart for an automotive camera during a scan at the start of the lens alignment process according to the illustrative embodiment.
FIG. 5 shows a MTF response chart for an automotive camera during a scan at the end of the lens alignment process according to the illustrative embodiment.

As shown in FIG. 3, during the alignment process 10, an initial Z scan 11 is performed where the lens is moved in a Z direction, along the camera axis, until a rough focus is achieved. This places the lens in a suitable starting position for subsequent alignment. After this, a full lens Z scan 12 is performed. FIG. 4 shows an example initial MTF response chart during this full lens Z scan 12. As shown, the MTF response characteristics 2a-e for each MTF ROI required under the camera's specifications are determined. The ROI focus windows 3a-e for each MTF region of interest are identified. Initially, these are out of alignment. For instance, this may be because the lens is tilted such at some ROIs at the periphery of the lens are tilted further away from the imager, whereas others are tilted closer. To correct this, the position of the lens relative to the imager is then adjusted in an adjustment step 13, for example by shifting the pitch, yaw, roll of the lens and/or the imager on its mounting relative to the imager. As the lens is tilted, the transverse (x/y) position of the lens relative to the imager may also be adjusted to realign the focussed image onto the centre of the imager in step 15.

Further Z scans may be performed to validate the positional changes until the ROI focus windows 3a-e have been aligned in a verification step 15. During this step, it is determined whether the focus windows are sufficiently aligned to meet a predetermined alignment threshold. If not, the lens is returned to the full lens Z scan 12 step. If the predetermined alignment threshold is met, the lens Z position is adjusted so that the centre of the combined depth of focus is optimised for the cameras specified requirements. In this respect, FIG. 5 shows an illustrative MTF response chart at the end of the lens alignment process. As shown, the individual focus windows 3a-e have been aligned at a centred z position. It will be understood that the alignment process may also adjust the lens position to take into account adhesive shrinkage, known ageing characteristics, and corner weighting requirements. As such, the lens position may be set slightly off optimal to pre-emptively compensate for these known effects.

Once complete, the lens may then be fixed in place by curing the adhesive, as discussed above. Accordingly, in this way, the alignment process may maximise the depth of focus across all the applicable regions of interest. Consequently, a camera with a high long-life performance may be achieved because the regions of interest will be above the minimum optical performance requirements for longer. Therefore, better compensation of defocus related to ageing may be achieved.

It will be understood that the embodiments illustrated above show applications only for the purposes of illustration. In practice, embodiments may be applied to many different configurations, the detailed embodiments being straightforward for those skilled in the art to implement.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A lens alignment method comprising:
scanning a plurality of regions of interest of a lens to determine optical characteristics for each region of interest as a position of the lens relative to an imager is adjusted;
determining a focus window for each region of interest based on the optical characteristics, wherein determining the focus windows for each region of interest comprises determining positions where the optical characteristics are above a predetermined threshold; and
adjusting the relative position of the lens to the imager based on the determined positions of the focus windows relative to one another, wherein adjusting the relative position of the lens to the imager comprises determining a center depth of focus for each focus window and adjusting the position of the lens in relation to the determined center depth of focus.

2. The method according to claim 1, wherein scanning the plurality of regions of interest of the lens to determine the optical characteristics for each region of interest as a position of the lens relative to the imager is adjusted further comprises:

determining Modulation Transfer Function characteristics as a distance between the lens and the imager is varied.

3. The method according to claim 1, wherein adjusting the position of the lens comprises:
adjusting the position for aligning the focus windows to within a predetermined range.

4. The method according to claim 1, wherein adjusting the position of the lens comprises:
adjusting at least one of a pitch, yaw, roll, position in a transverse plane, or position in a camera axis.

5. The method according claim 1, wherein adjusting the position of the lens comprises:
applying a material compensation factor for compensating for material tolerances.

6. The method according to claim 5, wherein the material tolerances include at least one of material shrinkage or predicted aging movement characteristics.

7. The method according to claim 1, further comprising:
providing the lens on a mount relative to the imager, wherein a curable adhesive is provided between the mount and the lens for fixing the lens in position when cured.

8. The method according to claim 1, further comprising:
fixing the position of the lens once its position is adjusted.

9. The method according to claim 1,
wherein scanning the plurality of regions of interest of the lens to determine the optical characteristics for each region of interest as a position of the lens relative to the imager is adjusted further comprises:
determining Modulation Transfer Function characteristics as a distance between the lens and the imager is varied.

10. The method according to claim 1,
further comprising:
providing the lens on a mount relative to the imager, wherein a curable adhesive is provided between the mount and the lens for fixing the lens in position when cured.

11. The method according to claim 1,
wherein scanning the plurality of regions of interest of the lens to determine the optical characteristics for each region of interest as a position of the lens relative to the imager is adjusted further comprises determining Modulation Transfer Function characteristics as a distance between the lens and the imager is varied, and
the method further comprises:
providing the lens on a mount relative to the imager, wherein a curable adhesive is provided between the mount and the lens for fixing the lens in position when cured.

12. The method according to claim 1,
wherein scanning the plurality of regions of interest of the lens to determine the optical characteristics for each region of interest as a position of the lens relative to the imager is adjusted further comprises determining Modulation Transfer Function characteristics as a distance between the lens and the imager is varied, and
the method further comprises:
fixing the position of the lens once its position is adjusted.

13. A lens alignment apparatus comprising:
a jig for holding a lens and an imager and adjusting their positions relative to one another;
an optical scanner for scanning a plurality of regions of interest of the lens to determine optical characteristics of the lens at each region of interest as the position of the lens relative to the imager is adjusted; and

7

8 a controller configured to determine a focus window for each region of interest based on the optical characteristics, wherein determining the focus windows for each region of interest comprises determining positions where the optical characteristics are above a predetermined threshold, and adjust the relative positions of the lens to the imager based on the predetermined positions of the focus windows relative to one another, wherein adjusting the relative position of the lens to the imager comprises determining a center depth of focus for each focus window and adjusting the position of the lens in relation to the determined center depth of focuses.

14. A camera comprising:

an imager; and a lens fixed relative to the imager for focusing an image thereon, wherein the fixed position of the lens relative to the imager is aligned by:

an optical scanner configured to scan a plurality of regions of interest of a lens to determine optical characteristics for each region of interest as a position of the lens relative to an imager is adjusted and determine a focus window for each region of interest based on the optical characteristics, wherein determining the focus windows for each region of interest comprises determining positions where the optical characteristics are above a predetermined threshold, and a controller configured to adjust the relative position of the lens to the imager based on the determined positions of the focus windows relative to one another, wherein adjusting the relative position of the lens to the imager comprises determining a center depth of focus for each focus window and adjusting the position of the lens in relation to the determined center depth of focuses.

\* \* \* \* \*